United States Patent [19]
Chigrinov et al.

[11] Patent Number: 5,784,139
[45] Date of Patent: Jul. 21, 1998

[54] IMAGE DISPLAY DEVICE

[75] Inventors: Vladimir Grigorievich Chigrinov, Moscow; Vladimir Marcovich Kozenkov; Nicolic Vasilievich Novoseletsky, both of Dolgoprudniv, all of Russian Federation; Victor Yurievich Reshetnyak; Yuriy Alexandrovich Reznikov, both of Kiev, Ukraine; Martin Schadt, Seltisberg, Switzerland; Klaus Schmitt, Lörrach, Germany

[73] Assignee: Rolic AG, Zug, Switzerland

[21] Appl. No.: 602,942

[22] Filed: Feb. 16, 1996

Related U.S. Application Data

[63] Continuation of Ser. No. 373,722, Jan. 17, 1995, abandoned, which is a continuation of Ser. No. 121,093, Sep. 14, 1993, abandoned, which is a continuation of Ser. No. 910,067, Jul. 8, 1992, abandoned.

[30] Foreign Application Priority Data

Jul. 26, 1991 [CH] Switzerland ............... 2245/91

[51] Int. Cl.$^6$ ................................................. G02F 1/1337
[52] U.S. Cl. ............................................................ 349/117
[58] Field of Search ................. 359/73, 68; 349/117, 349/118, 119, 120, 121

[56] References Cited

U.S. PATENT DOCUMENTS

| | | | |
|---|---|---|---|
| 2,623,433 | 12/1952 | Stipek | 88/16.8 |
| 4,526,439 | 7/1985 | Okoshi et al. | 350/128 |
| 4,615,962 | 10/1986 | Gartio | 430/20 |
| 4,780,383 | 10/1988 | Garrett et al. | 430/11 |
| 4,792,850 | 12/1988 | Liptoh et al. | 358/92 |
| 4,810,433 | 3/1989 | Takayanagi et al. | 204/22 |
| 4,870,486 | 9/1989 | Nakagawa et al. | 358/22 |
| 4,893,907 | 1/1990 | Mallinson | 350/350 |
| 4,983,479 | 1/1991 | Broer et al. | 430/20 |
| 5,007,715 | 4/1991 | Verhulst | 350/334 |
| 5,076,669 | 12/1991 | Black et al. | 359/63 |
| 5,113,285 | 5/1992 | Franklin et al. | 359/465 |
| 5,122,890 | 6/1992 | Makow | 350/63 |
| 5,179,457 | 1/1993 | Hirataka et al. | 359/73 |
| 5,189,538 | 2/1993 | Arakawa | 359/73 |
| 5,246,748 | 9/1993 | Gillberg-Laforce et al. | 428/1 |
| 5,548,427 | 8/1996 | May | 359/73 |

FOREIGN PATENT DOCUMENTS

| | | |
|---|---|---|
| 337 555 | 4/1989 | European Pat. Off. . |
| 367 288 | 11/1989 | European Pat. Off. . |
| 387 059 | 3/1990 | European Pat. Off. . |
| 63-158525 | 7/1988 | Japan . |
| 64-519 | 1/1989 | Japan . |

OTHER PUBLICATIONS

Patent Abstracts of Japan, vol. 12, No. 488 (P–803) (3335), Dec. 20, 1988–JP–A–63 201 626.
Abstract for Documents B4–JP–A–64–519.
Abstract for Documents B5–JP–A–63–158525.

*Primary Examiner*—William L. Sikes
*Assistant Examiner*—James A. Dudek
*Attorney, Agent, or Firm*—Bryan Cave LLP

[57] ABSTRACT

The image-producing device comprises a liquid crystal cell with a liquid crystal (10, 21, 44) between two plates provided with drive electrodes (2, 6; 24, 25; 42, 46) and wall orientation layer (3, 7; 26,27; 43, 45) and an optically anisotropic polymeric additional element (9, 31, 52). The additional element, which can be a separate element or in the form of a coating or a foil stuck directly to the cell, comprises an oriented photopolymer.

18 Claims, 3 Drawing Sheets

5,784,139

IMAGE DISPLAY DEVICE

This is a continuation, of application Ser. No. 08/373,722, filed Jan. 17, 1995, now abandoned which is a Rule 60 Continuation of Ser. No. 08/121,093, filed Sep. 14, 1993, now abandoned, which is a Rule 62 Continuation of Ser. No. 07/910,067, filed Jul. 8, 1992, now abandoned.

FIELD OF THE INVENTION

The invention relates to an image display device comprising a liquid crystal cell made up of a liquid crystal compound disposed between two plates provided with drive electrodes, wall orientation layers and an optically anisotropic polymeric additional element.

BACKGROUND OF THE INVENTION

In a known manner, liquid crystal displays or liquid crystal light valves, etc (hereinafter comprehensively described as "liquid crystal cells") are provided for various purposes with optically and isotropic additional layers or additional elements. Conventionally, for example, the typical yellow or blue colouring in highly twisted nematic liquid crystal displays (STN or SBE-LCDs) is compensated by a double refracting additional layer to obtain a black-white contrast. The additional layer can be a liquid crystal and constructed in similar manner to an electro-optically active liquid crystal display (double layer STN-LCDs). Non-liquid crystal compensation layers, however, are also known, e.g. "retarder" foils of optically anisotropic polymeric material. These foils have hitherto been produced by mechanical stretching.

Other applications of optically anisotropic additional elements in conjunction with liquid crystal cells include the use of λ/4 plates or λ/2 for rotating the direction of polarization of plane-polarized light or for generating elliptically polarized light from plane polarized light or vice versa.

Optically anisotropic additional layers or elements are usually adhered to the plates bounding the liquid crystal, particularly in the case of polymeric foils. This requires additional critical working steps (blister-free and dust-free adhesion processes). In addition, an electrostatic charge is produced by pulling the protective foils off the adhesive surfaces, and this increases the dust and reduces the output of liquid crystal cells. Finally, it is impossible to provide these mechanically stretched additional layers with optical properties which vary in accordance with a desired pattern.

The aim of the invention is to obviate these disadvantages of the prior art and to embody novel liquid crystal displays and projection concepts.

SUMMARY OF THE INVENTION

According to the invention, in the image-representing devices of the type described above, the additional element comprises a layer of an oriented photopolymer. That is, the invention relates to an image display device comprising a liquid crystal cell made up of a liquid crystal between two plates provided with drive electrodes and wall orientation layers and an optically anisotropic polymeric additional element, characterized in that the additional element comprises a layer of an oriented photopolymer.

DETAILED DESCRIPTION OF THE INVENTION

Figure 1:
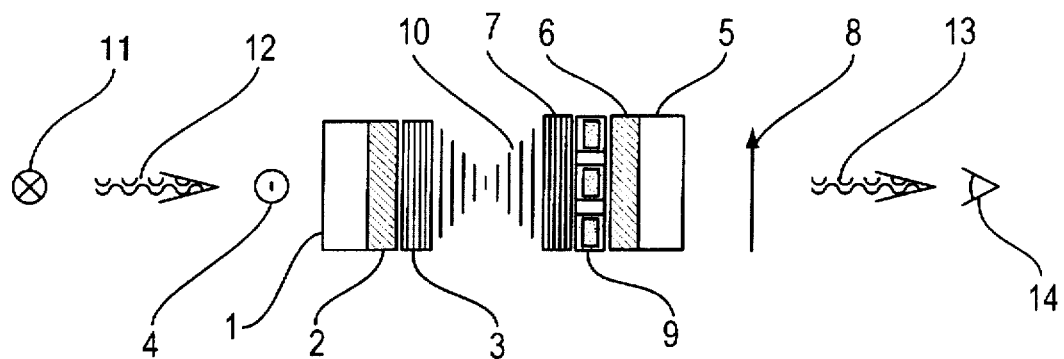
FIG. 1 is a diagram of a color-compensated STN liquid crystal display.

The invention is directed to an image display device which includes a liquid crystal cell having a liquid crystal disposed between two plates which have electrodes attached thereto. The plates have orienting layers disposed thereon. A retarder layer, which is optically anisotropic, comprises an oriented photopolymer and is disposed on the plates.

For the purpose of the present description, the term "photopolymers" denotes polymers or composition of polymers which are photochemically modified by polarized light.

Oriented photomodification can be used to produce transparent polymer layers with a defined optical path difference or retardation $\delta$ $\Delta n \cdot d$, where $\Delta n = (n_e - n_o) =$ the photo-induced optical anisotropy between the ordinary refractive index $n_o$, and d is the thickness of the polymer layer. The optical path difference $\delta$ is determined by the duration and intensity of illumination and also by the layer thickness d and take values in the range between 0 and 400 nm. If the monomer film is illuminated with non-polarized light, $\delta=0$. Also, the direction of $n_e$ can be determined by the direction of oscillation of the plane-polarized light used for photomodification. The direction of oscillation can be varied in the range from 0° to 180°.

Patterns or large-area optical retarder layers can be produced with the previously-described methods and materials, opening up a number of possibilities for manufacturing novel liquid crystal displays. The novel liquid crystal displays can be operated in transmission or in reflection. The electro-optical effects used can in principle be any known field effects, i.e. the twisted nematic effect (TN-LCDs), supertwisted nematic effects (STN-LCDs), deformation of aligned phases (DAP-LCDs) or the following ferroelectric field effects: surface stabilized ferro- electric (SSF) effect, deformed helical ferro-electric (DBF) effect or short pitch bistable ferroelectric (SBF) effect.

In a preferred embodiment of the invention, the oriented photopolymer layer (retarder layer) is divided into a number of separate predetermined regions having optical properties which vary from region to region.

In another preferred embodiment of the invention, the regions form a regular grid in which two different optical properties alternate.

Preferably the optical path difference and/or the orientation of the refractive index ellipsoid vary from region to region.

Preferably the liquid crystal is a super twisted nematic liquid crystal and the oriented photopolymer layer has an optical path difference which compensates the inherent color of the cell.

Alternatively and optionally, the oriented photopolymer layer has an optical path difference which alters the color of the cell.

In a particularly preferred embodiment of the invention the regions form different color pixels for the color display.

In another preferred embodiment of the invention, the optical properties of the regions result in different directions of polarization, so that different picture items can be simultaneously displayed, and preferably the different picture items comprise the right and left items of a stereoscopic picture.

In another preferred embodiment of the invention, the additional element is part of a screen in the image plane of a rear projection system.

The STN cell shown diagrammatically in FIG. 1 comprises two glass plates 1 and 5 coated with drive electrodes 2 and 6, the electrodes are usually segmented, i.e. in the case of a display cell. The electrode layer 2 on the plate 1 shown to the left of the drawing is covered in a per se conventional manner with an orienting layer 3 by means of which the adjacent molecules in the liquid crystal 10 between the plates are aligned in a preferred direction.

The right-hand plate 5 has a similar orientation layer 7 on its surface facing the liquid crystal. However, an intermediate layer 9 of oriented photopolymer is disposed between layer 7 and the electrode layer 6. The intermediate layer 9 is optically anisotropic and therefore in known manner is suitable as a retarder layer for color compensation of STN cells. A particularly advantageous feature of the photopolymer layer used is that its anisotropic properties can be influenced within wide limits by the conditions of manufacture during photomodification. The optical path difference of the layer 9 and the direction of the major axis of the double refraction ellipsoid An can thus be given the exact construction for optimum color compensation.

Instead of being uniform, layer 9 can be structured in form, i.e. its optical properties can differ in different areas. In this manner, for example, areas with color compensation, i.e. black-white contrast, can alternate with areas which are not compensated, i.e. are colored.

Instead of a layer 9 on one of the two plates, retarder layers can be provided on both plates. This is important during reflection operation of the liquid crystal cell.

Alternatively, the retarder layer 9 can be disposed between the glass plate 1 and the electrode layer 2. This is particularly advantageous when the thickness of the retarder layer 9 must not have any electrical effect, i.e. no voltage drop across layer 9 must occur when a voltage is applied to the electrodes.

Alternatively, the retarder layer 9 can be applied to the outer substrate surface or surfaces 1 and 5.

The orientation layers 3 and 7 can be given their orientating action in conventional manner by oblique vapor deposition or by abrasion. Alternatively, oriented photopolymers can be used for the orientation layers.

The liquid crystal display cell shown in FIG. 1 is supplemented by an input plane polarizer 4 and an output plane polarizer 8 disposed crosswise relative to the input polarizer. Alternatively, in known manner, circular polarizers can be used instead of plane polarizers.

Non-polarized light 12 coming from a source 11 is plane-polarized by polarizer 4 in the direction at right angles to the plane of the drawing and, on transit through the liquid crystal when the latter is switched off as shown, is converted into elliptically polarized light by splitting and partial twisting. If there were no layer 9, the light would be colored as a result of differences in the transit time in the liquid crystal 10, depending on wavelength. In known manner, layer 9 brings about color compensation, resulting in a black-white contrast between the switched-on and the switched-off state. The output polarizer 8 transmits to the observer 14 that part 13 of the light which oscillates parallel to its direction of polarization.

In the switched-on state and when the STN cell is operated in positive contrast mode, the liquid crystal 10 becomes optically uniaxial for transmitted light, so that linear polarization is maintained, the output polariser 8 blocks the light, and the observer 14 sees no light.

The optical path difference and the position of the double refraction ellipsoid of the optical retarder layer can be chosen so as to compensate the inherent color of STN display cells, or alternatively these values can be chosen in conjunction with the polarizer positions so as to generate colors by means of the cell in FIG. 1.

As is known, in the case both of optically bistable field effects and effects with grey shades, the properties (wave guiding, double refraction) on which the effects are based can be used for generating colors, if the polarizers are in suitable positions. These interference colors can be influenced by one or more additional retarder layers. Various adjacent color surfaces can be obtained, owing to the already-mentioned possibility of structuring the retarder layer with regard to its optical properties, i.e. patterns with various path differences and positions of the double refraction ellipsoid in various areas.

Figure 2:
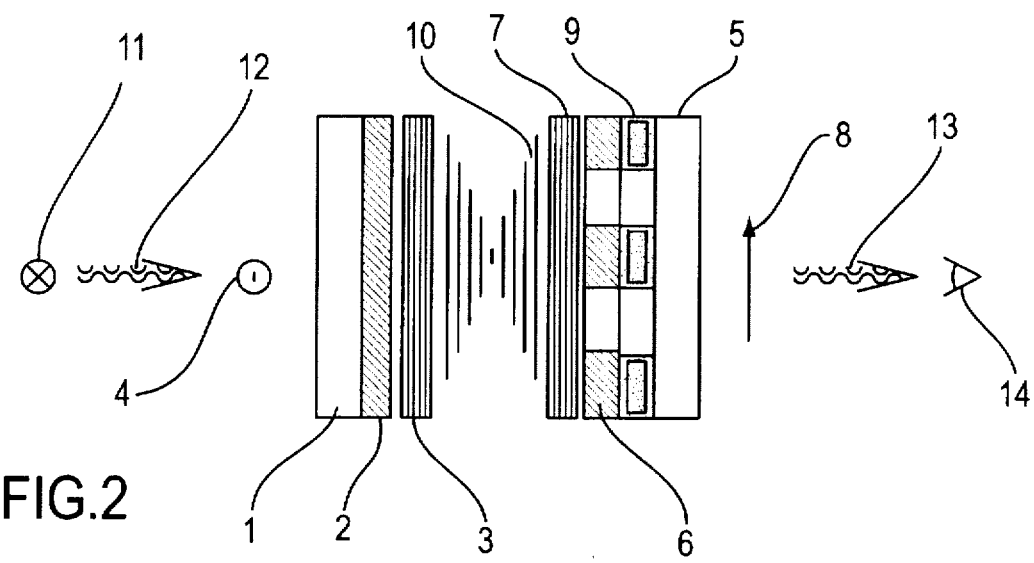
FIG. 2 is a diagram of a liquid crystal cell for color display.
Figure 3:
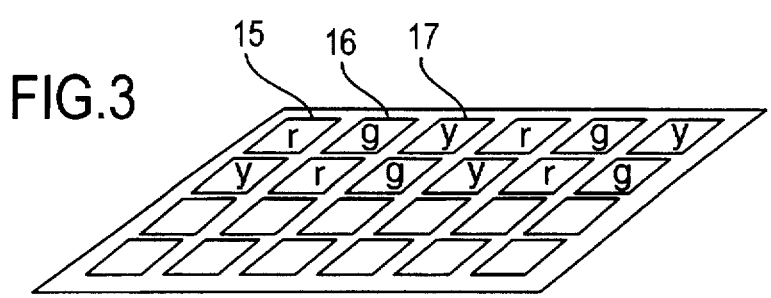
FIG. 3 shows a grid of colored areas belonging to the cell in FIG. 2.

An example of a color display with variously colored pixels disposed side by side in a regular grid is shown diagrammatically in FIGS. 2 and 3.

A display cell, shown diagrammatically in section in FIG. 2, has substantially the same construction as the cell in FIG. 1. In contrast to FIG. 1, the retarder layer 9 changes places with the electrode layer 6. Also, these two layers are divided into individual areas in a grid. The result in plan view, in the case of the electrode layer 6 and the retarder layer 9, is the image shown in FIG. 3, made up of pixels disposed in lines and columns.

To obtain a color display, the retarder layer is disposed e.g. so as to obtain red in the region of the top left pixel 15, green in the region of the adjacent right pixel 16, yellow in the region of the next pixel 17 of the line, followed by red again. In the next line the colors are displaced sideways by one step.

A wide range of optical path differences of the optical retarder layer or layers in the various regions can be obtained by varying the duration (illumination time) of light irradiation during photomodification or by varying the intensity of the polarized light.

In addition, as already mentioned, the wall orientation layers can be produced in grid form with varying directions of orientation, by sequential photomodification. This is also a method of varying the position of the nematic directions relative to the polarizers for each pixel. Very varied color effects can be obtained in co-operation with the optical properties of the retarder layer or layers, specific to the pixel.

As an alternative to FIG. 2, the optical retarder layers can be disposed between electrode layers and wall orientation layers or on the outer sides of the glass plates.

Figure 4:
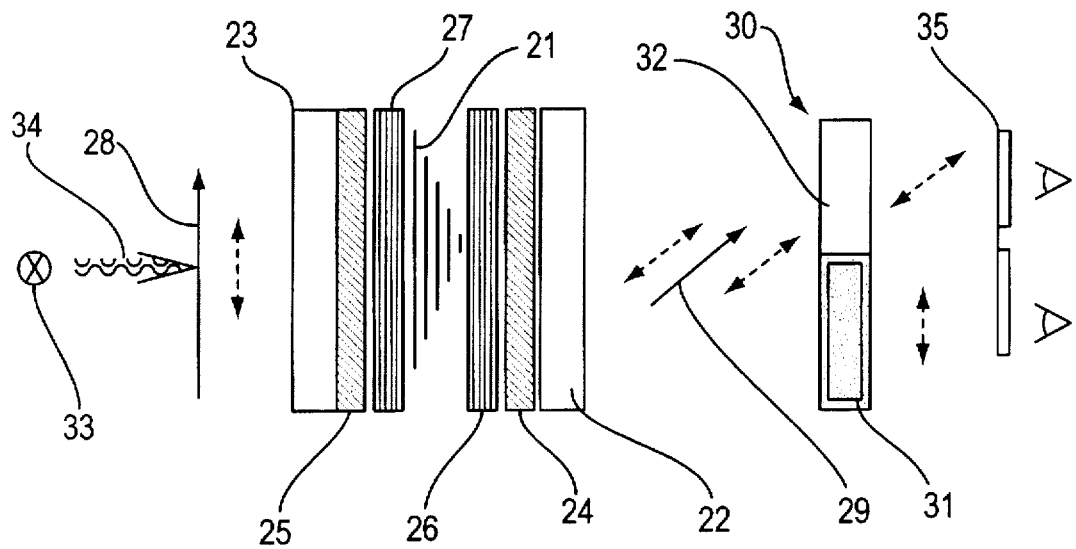
FIG. 4. is a diagram of a liquid crystal cell for reproducing stereoscopic images.

A similar configuration can be used to construct a liquid crystal for reproducing a stereoscopic image. A display of this kind is shown diagrammatically in section in FIG. 4. A conventional twisted cell comprises a nematic liquid crystal 21 twisted through 90° between two glass plates 22, 23 provided with electrodes 24, 25 and orientation layers 26, 27.

Also, two crossed polarizers 28, 29 are provided, together with a retarder layer 30 on the surface exposed to light behind the output polarizer 29. The retarder layer has optically isotropic regions and regions in which the path difference is λ/2.

Light 34 coming from a source 33 is plane-polarized by the input polarizer 28. The directions of vibration of the electric vector of the light are indicated by respective chain-line arrows.

After transit through the switched-off twisted cell, the light vibrates at right angles to the plane of the drawing and can thus pass through the output polarizer 29. In transit through the next retarder layer 30, the direction of polarization is rotated through 90° in the region in which the retarder layer acts as a λ/2 plate. In the other region, the direction of polarization of the light is not rotated. If, by suitable actuation of the associated electrode regions, the right-hand items of a stereo image are supplied to one region of the retarder layer and the left-hand items are supplied to the other region, a stereo image can be observed through polarization glasses 35.

Alternatively, in this arrangement, the output polarizer 29 can be incorporated with the retarder layer.

Figure 5:
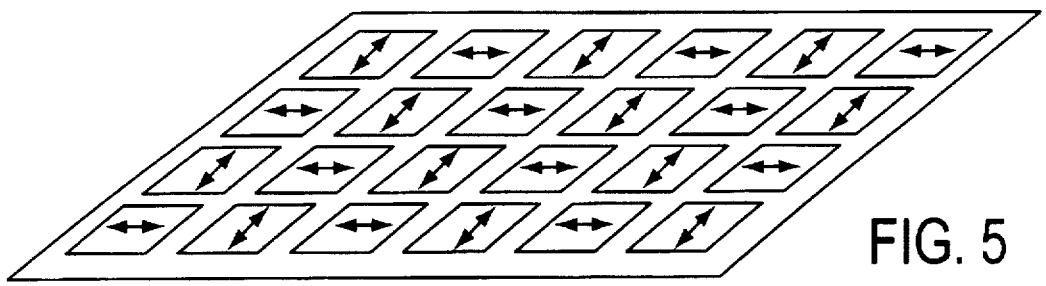
FIG. 5 shows a polarization grid of the cell in FIG. 4.

In FIG. 5, which shows the division of the surface of the display cell into pixels, the various directions of polarisation of adjacent pixels are shown e.g. as suitable for black and white reproduction. However, a color display can be obtained in similar manner without difficulty, by a corresponding additional distribution of the pixels.

The construction described hereinbefore for a TN display can be obtained in similar manner with other liquid crystal effects, e.g. STN or ferroelectric effects.

Instead of dividing the retarder layer into regions with δ=λ/2 and optically isotropic regions, a different distribution of optical anisotropy is possible. For example, δ can equal λ/4 for some of the regions, so that the transmitted plane-polarized light is converted into circular-polarized light, e.g. right-handed. In other regions, δ is set at ¾ λ, so that the light is also circular-polarized but in the opposite direction of rotation. This is another method of showing the left and the right picture items simultaneously and viewing them stereoscopically through suitable glasses containing a left-hand and a right-hand circular polarizer.

Figure 6:
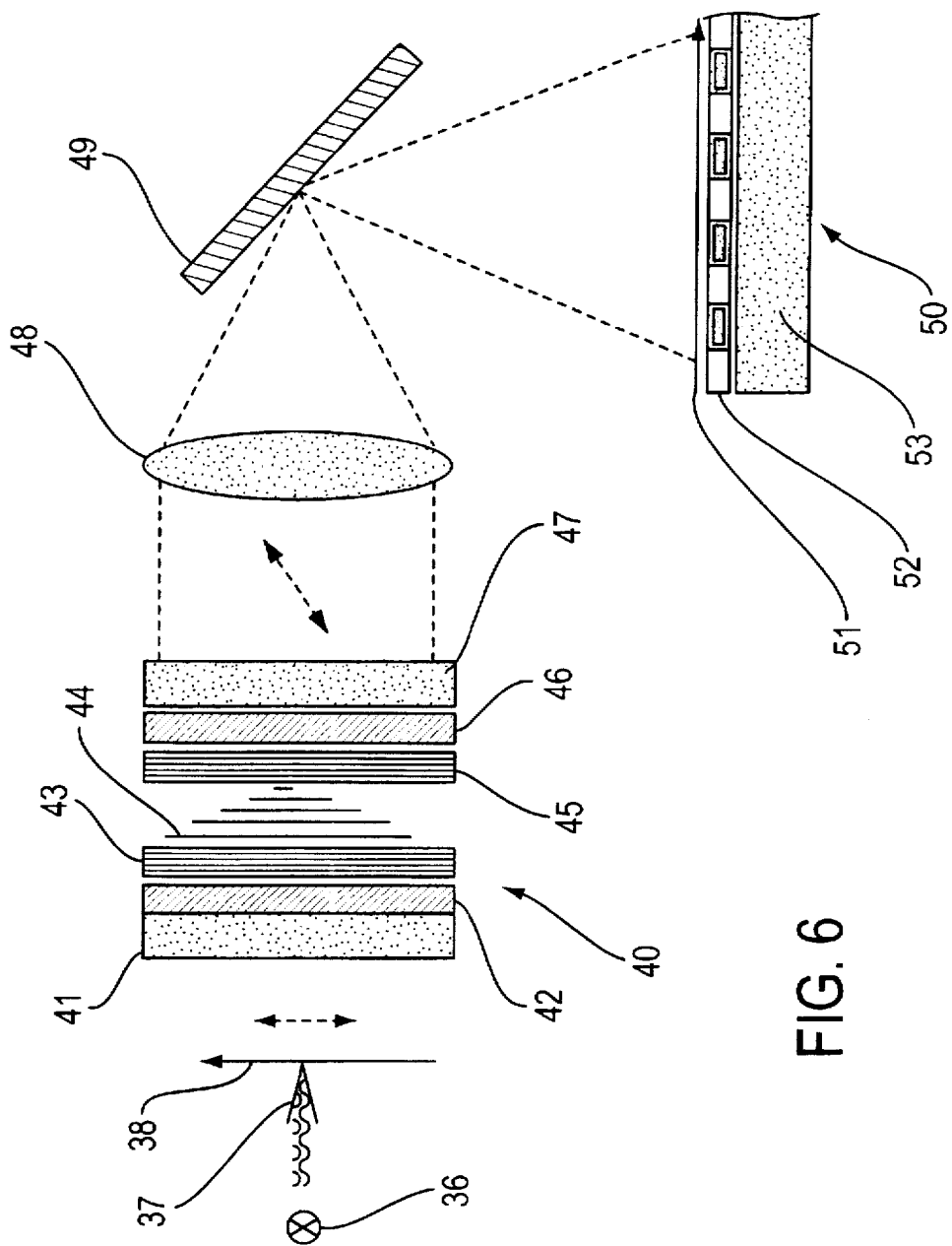
FIG. 6. is a diagram of a rear projection device for reproducing stereoscopic images.

FIG. 6 shows a rear projection device based on the same principle. It contains a plane polarizer 38 in the path of the light coming from a source 36 and polarizing the light parallel to the plane of the drawing. A TN liquid crystal cell 40 is disposed behind the polarizer and comprises an input-side glass plate 41 with an electrode layer 42, an orientation layer 43, a nematic liquid crystal 44 twisted through 90° and a glass plate 47 provided with an orientation layer 45 and electrodes 46. In the switched-off state, light leaves the cell in a direction of polarization rotated through 90°. The light now reaches a focusing lens system 48 and a mirror 49, which directs the light towards a projection screen 50. The screen comprises a plane polarizer 51 and a retarder layer 52, both on a diffuse transparent substrate 53. The projection screen is in the image plane of the projection system.

The retarder layer consists of a structured photopolymer with regions alternating between isotropy and δ=λ/2. Like the display in FIG. 4, the projection device in FIG. 5 can operate with circular-polarized light if the retarder layer is divided into λ/4 and ¾λ pixels. If color projection is required, a corresponding division is necessary for all color pixels on the right and left image.

What is claimed is:

1. An image display device comprising a liquid crystal cell having a liquid crystal disposed between two plates provided with drive electrodes, wall orientation layers, and an optically anisotropic layer containing a linearly polarized light modified polymer.

2. The device according to claim 1, wherein the anisotropic layer is divided into a number of separate regions having optical properties which vary from region to region.

3. The device according to claim 2, wherein the regions form a regular grid in which two different optical properties alternate.

4. The device according to claim 2 were in the optical path varies from region to region.

5. The device according to claim 2, wherein a position of a double refraction ellipsoid varies from region to region.

6. The device according to claim 1, wherein the liquid crystal is a super twisted nematic liquid crystal and the anisotropic layer has an optical path difference which compensates the inherent color of the cell.

7. The device according to claim 2, wherein the anisotropic layer has an optical path difference which alters the color of the cell.

8. The device according to claim 7, wherein the regions form different color pixels for the color display.

9. The device according to claim 3, wherein the optical properties of the regions result in different directions of polarization, so that different picture items can be simultaneously displayed.

10. The device according to claim 4, wherein the optical properties of the regions result in different directions of polarization, so that different picture items can be simultaneously displayed.

11. The device according to claim 5, wherein the optical properties of the regions result in different directions of polarization, so that different picture items can be simultaneously displayed.

12. The device according to claim 6, wherein the anisotropic layer is divided into a number of separate regions and the optical properties of the regions result in different directions of polarization, so that different picture items can be simultaneously displayed.

13. The device according to claim 9, wherein the different picture items comprise the right and left items of a stereoscopic picture.

14. The device according to claim 13, wherein the anisotropic layer is part of a screen in an object plane of a rear projection system.

15. The device according to claim 13, wherein the anisotropic layer is part of a screen in an image plane of a rear projection system.

16. The device according to claim 13, wherein the anisotropic layer is part of a screen in an object plane of a forward projection system.

17. The device according to claim 10, wherein the anisotropic layer is part of a screen in an image plane of a forward projection system.

18. An image display device comprising a liquid crystal having a liquid crystal disposed between two plates provided with drive electrodes, wall orientation layers, and an optically anisotropic layer containing a linearly polarized light modified polymer photochemical, the optically anisotropic layer being divided into a number of separate regions, the optical properties of the regions resulting in different directions of polarization, so that different picture items can be simultaneously displayed.

* * * * *

UNITED STATES PATENT AND TRADEMARK OFFICE
CERTIFICATE OF CORRECTION

PATENT NO. : 5,784,139
DATED : July 21, 1998
INVENTOR(S) : Vladimir Grigorievich Chigrinov, et al.

It is certified that error appears in the above-identified patent and that said Letters Patent is hereby corrected as shown below:

Title page, section [75], change the inventors residence from "Dolgoprudniv" to --Dolgoprudniy--; and Claim 1, line 2, after "crystal", insert --cell--.

Signed and Sealed this

Tenth Day of August, 1999

Attest:

Q. TODD DICKINSON

*Attesting Officer*     *Acting Commissioner of Patents and Trademarks*